(12) United States Patent
Otake et al.

(10) Patent No.: US 9,039,067 B2
(45) Date of Patent: May 26, 2015

(54) STRUCTURE OF VEHICLE DOOR (71) Applicant: SHIROKI CORPORATION, Fujisawa-shi (JP)

(72) Inventors: Yasuhiro Otake, Toyohashi (JP); Takayasu Bito, Toyokawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 14/219,964

(22) Filed: Mar. 19, 2014

(65) Prior Publication Data
US 2014/0284961 A1 Sep. 25, 2014

(30) Foreign Application Priority Data

Mar. 21, 2013 (JP) ................................. 2013-057784

(51) Int. Cl.
B60J 5/04 (2006.01)

(52) U.S. Cl.
CPC .............. B60J 5/0455 (2013.01); B60J 5/0408 (2013.01); B60J 5/0451 (2013.01)

(58) Field of Classification Search
CPC ....... B60J 5/0455; B60J 5/0408; B60J 5/0451
USPC .......................................... 296/146.6, 187.12
See application file for complete search history.

(56) References Cited

U.S. PATENT DOCUMENTS 6,332,641 B1 * 12/2001 Okana ........................ 296/146.6
7,097,742 B2 * 8/2006 Furuse ........................ 296/146.6
8,042,860 B2 * 10/2011 Takahashi et al. ......... 296/146.6

FOREIGN PATENT DOCUMENTS

JP 2008-168707 A 7/2008

* cited by examiner

Primary Examiner — Lori L Lyjak
(74) Attorney, Agent, or Firm — McGinn IP Law Group, PLLC (57) ABSTRACT This disclosure relates an attachment structure of a door sash of the vehicle door. The vehicle door of this disclosure includes: a door sash; a bracket, which joins the door sash to an inner panel; and a patch, which is joined to the bracket and the door sash and which sandwiches the door sash in cooperation with the bracket, thereby reinforcing the bracket.

19 Claims, 7 Drawing Sheets

STRUCTURE OF VEHICLE DOOR

CROSS-REFERENCE TO RELATED APPLICATION

This application claims priority from Japanese Patent Application No. 2013-057784 filed on Mar. 21, 2013, the entire subject matter of which is incorporated herein by reference.

TECHNICAL FIELD

This disclosure relates to a vehicle door, and specifically, to an attachment structure of a lower part of a door sash of the vehicle door.

BACKGROUND

Figure 6:
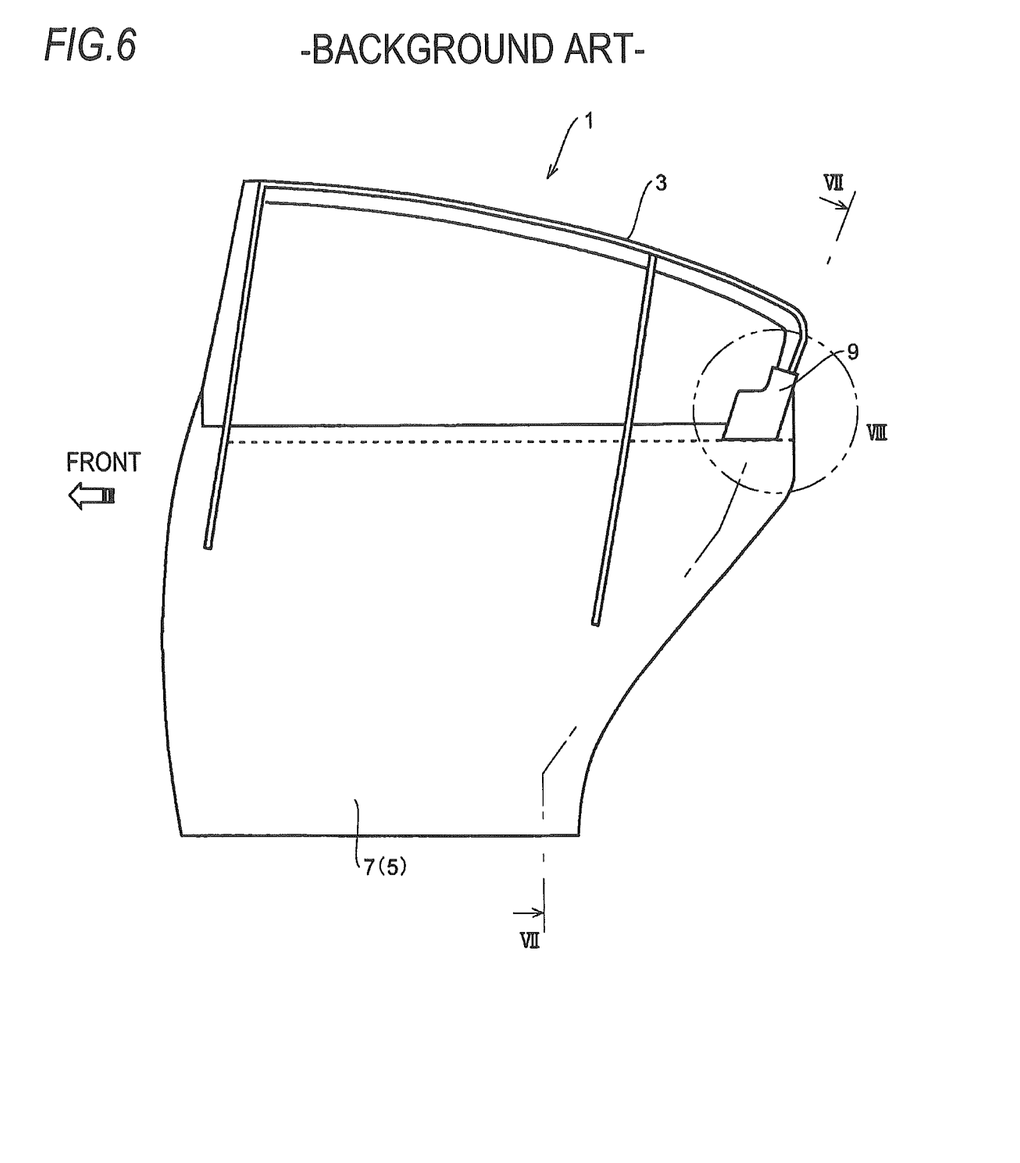
FIG. 6 is a configuration view of a vehicle door, which is seen from a vehicle interior, in a background art.

An example of a background vehicle door is described with reference to FIGS. 6 to 8. FIG. 6 is a configuration view of a vehicle door, which is seen from a vehicle interior, FIG. 7 is a cross-sectional view taken along a line VII-VII of FIG. 6, and FIG. 8 is an enlarged view of a part VIII of FIG. 6.

As shown in FIG. 6, an upper part of a vehicle door 1 is provided with a door sash 3 that holds a door glass. As shown in FIGS. 6 and 7, a lower part of the door 1 is configured by an outer panel 5 and an inner panel 7.

Figure 7:
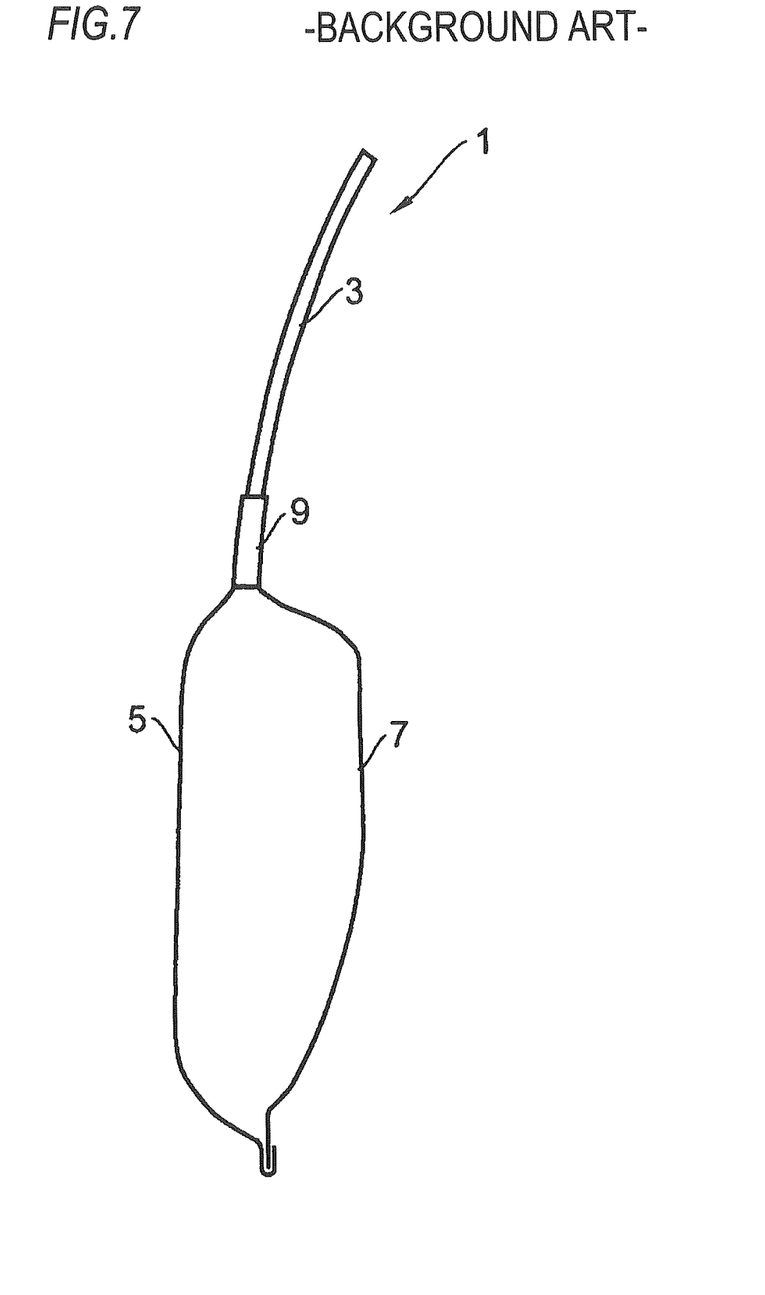
FIG. 7 is a cross-sectional view taken along a line VII-VII of FIG. 6.
Figure 8:
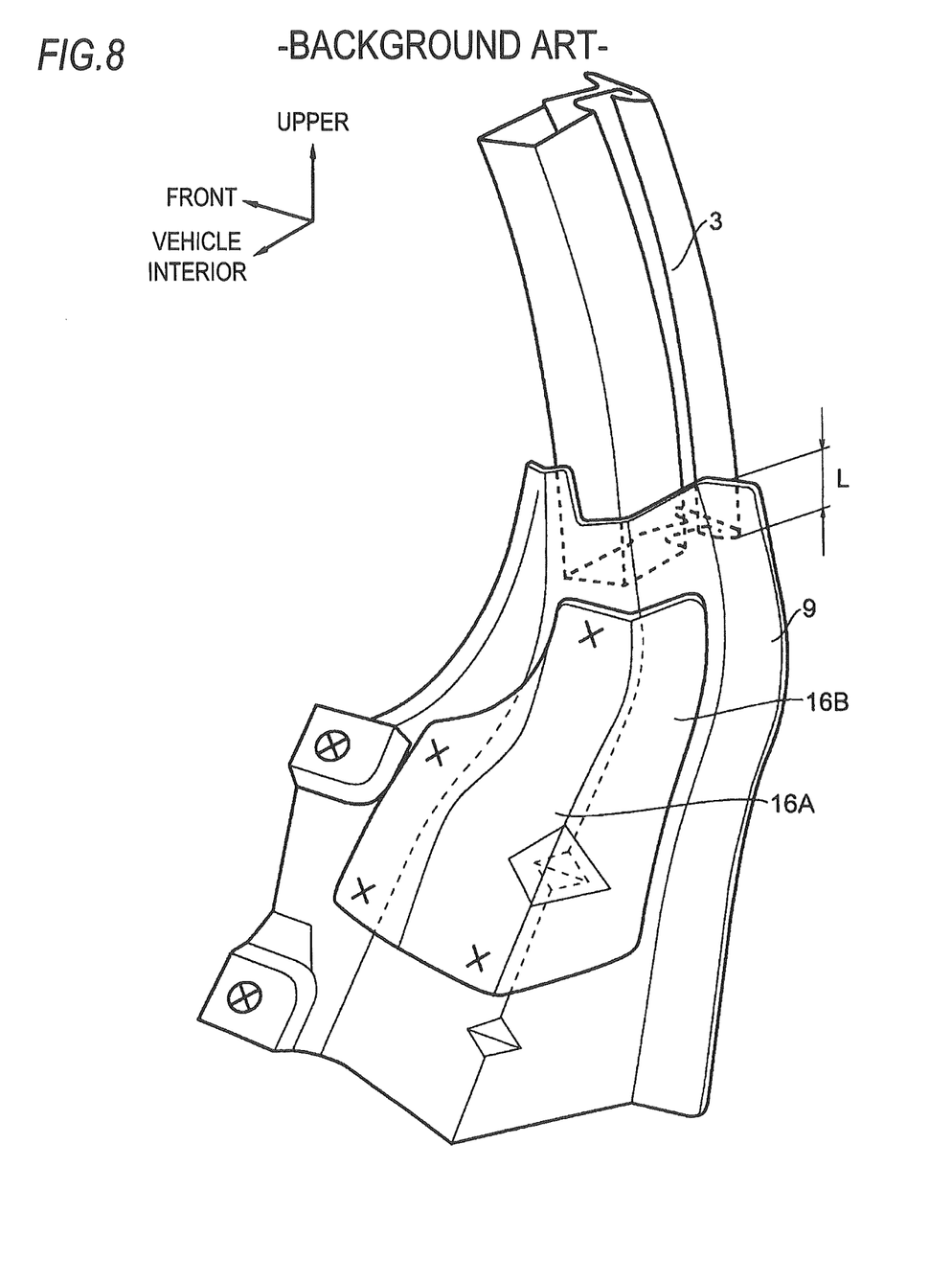
FIG. 8 is an enlarged view of a part VIII of FIG. 6.

As shown in FIGS. 6 to 8, a vehicle interior face of a lower part of the door sash 3 and the inner panel 7 are connected via a bracket 9. In the meantime, the bracket 9 also serves as a base to which a lock device and the like of the door are attached.

Also, patches 16A and 16B may be attached to the bracket 9 so as to reinforce a part of the bracket 9 of which strength is relatively weak (for example, refer to JP-A-2008-168707).

SUMMARY

Regarding the vehicle door having the above configuration, a sufficient attachment length (a length L in FIG. 8) of the door sash 3 and the bracket 9 may not be secured due to a shape of the vehicle door and a shape of the lock device attached to the bracket 9.

In this case, the attachment strength of the door sash 3 and the bracket 9 becomes insufficient and thus stiffness of the lower part of the door sash 3 is deficient. Therefore, the door sash 3 may be drawn towards a vehicle exterior upon high-speed traveling.

This disclosure provides at least a vehicle door where the attachment strength of a door sash and a bracket is improved and the stiffness of the chassis is improved.

A vehicle door of this disclosure includes: a door sash; a bracket, which joins the door sash to an inner panel; and a patch, which is joined to the bracket and the door sash and which sandwiches the door sash in cooperation with the bracket, thereby reinforcing the bracket.

The other features of this disclosure will be further clarified from an illustrative embodiment of this disclosure to be described later and the accompanying drawings.

According to this disclosure, the patch is joined to the bracket and the door sash, sandwiches the door sash in cooperation with the bracket and reinforces the bracket. Thereby, the attachment strength of a lower part of the door sash and the bracket is improved and the stiffness of the door sash is improved.

The other effects of this disclosure will be further clarified from an illustrative embodiment of this disclosure to be described later and the accompanying drawings.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
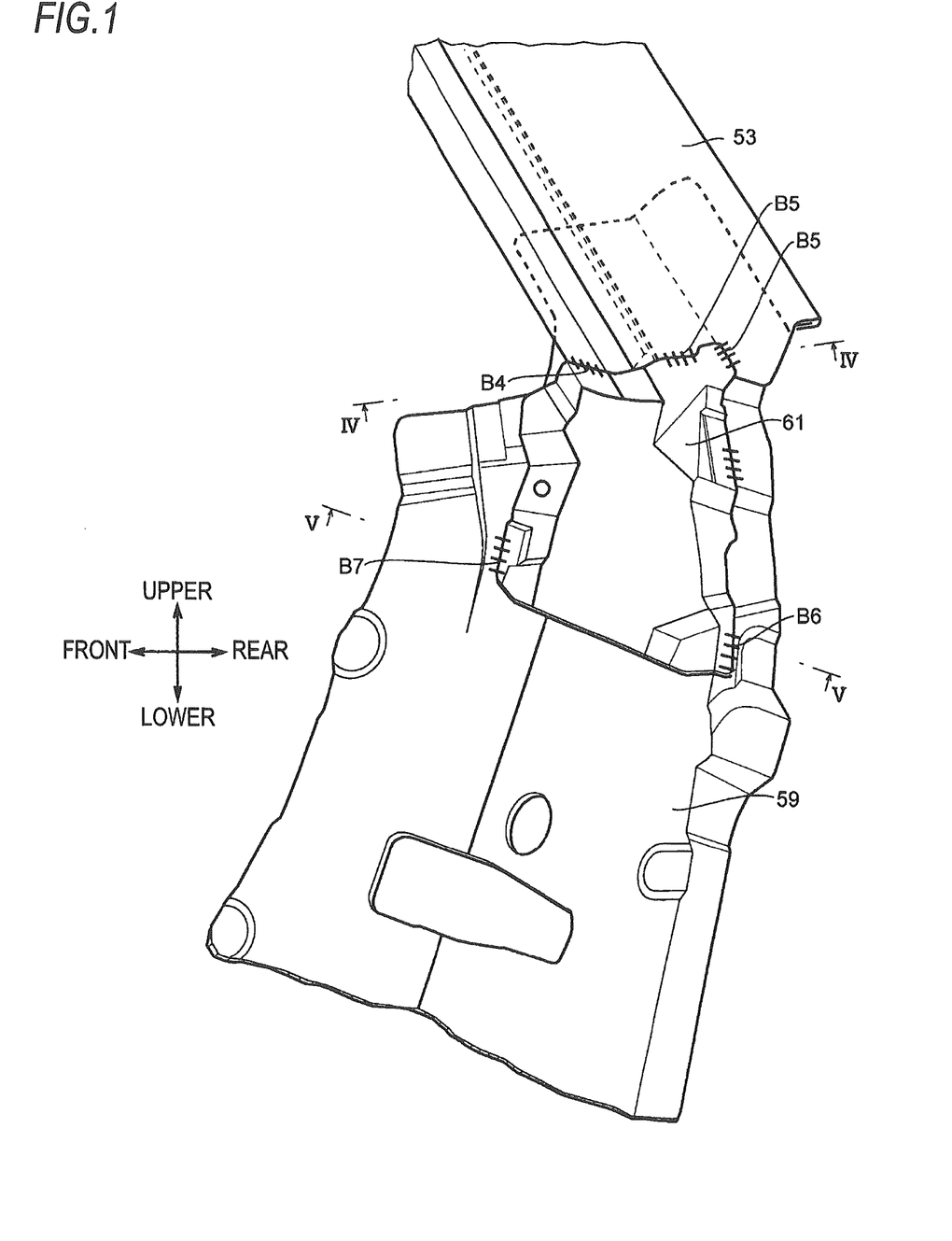
FIG. 1 illustrates a vehicle door of an illustrative embodiment of this disclosure and is an enlarged view of a part I of FIG. 2.
Figure 2:
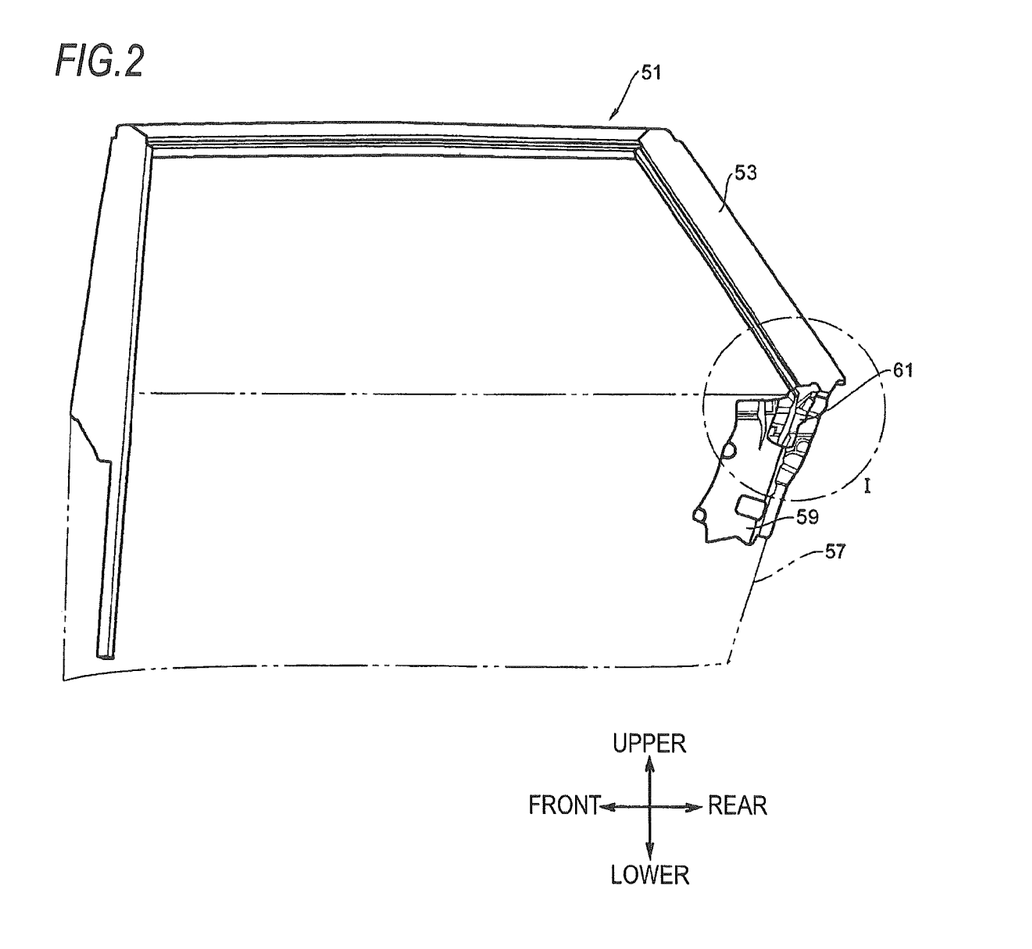
FIG. 2 illustrates the entirety of a door sash, a bracket and a patch of the illustrative embodiment, which is seen from a vehicle exterior.
Figure 3:
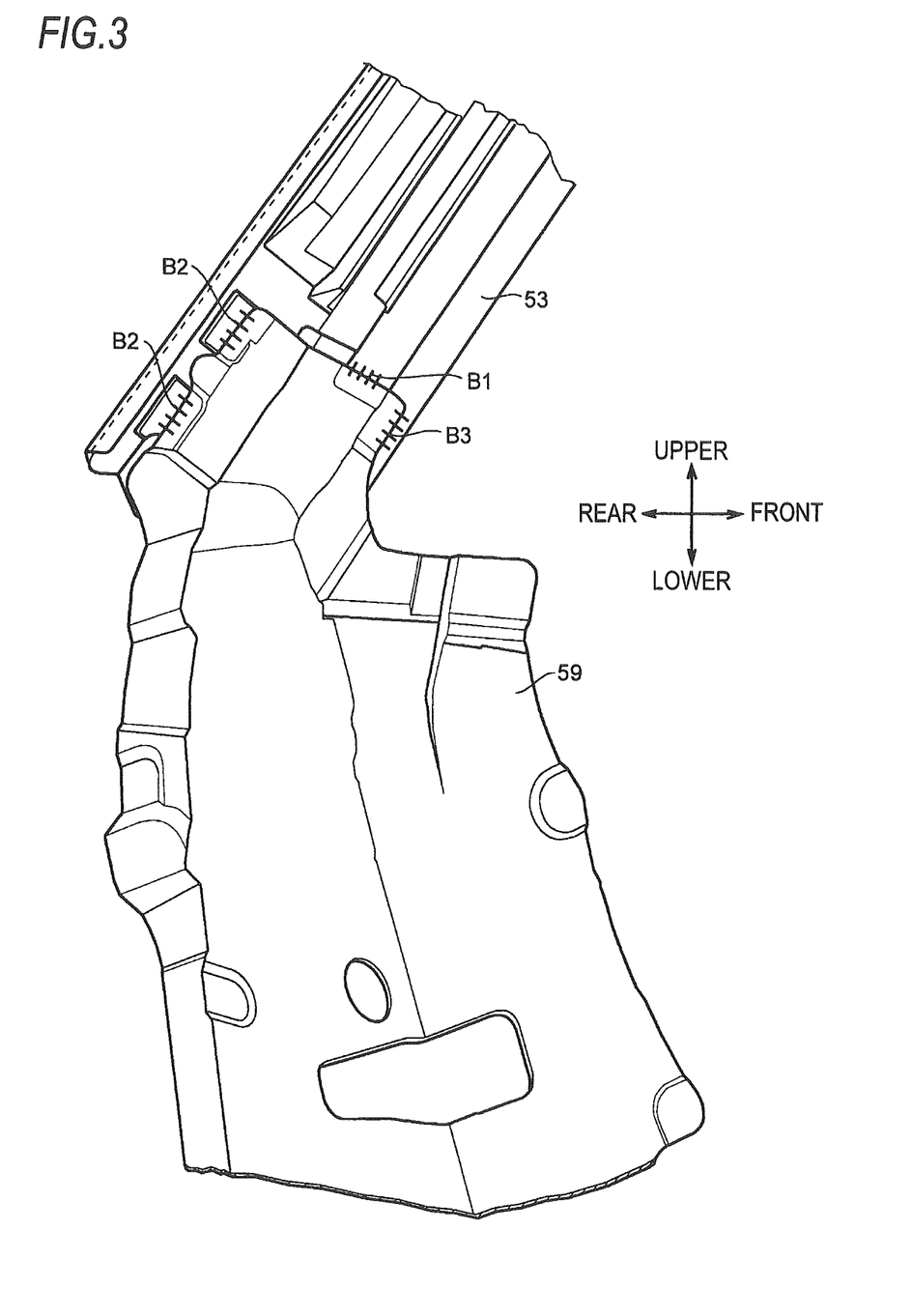
FIG. 3 is a rear view of FIG. 1.
Figure 4:
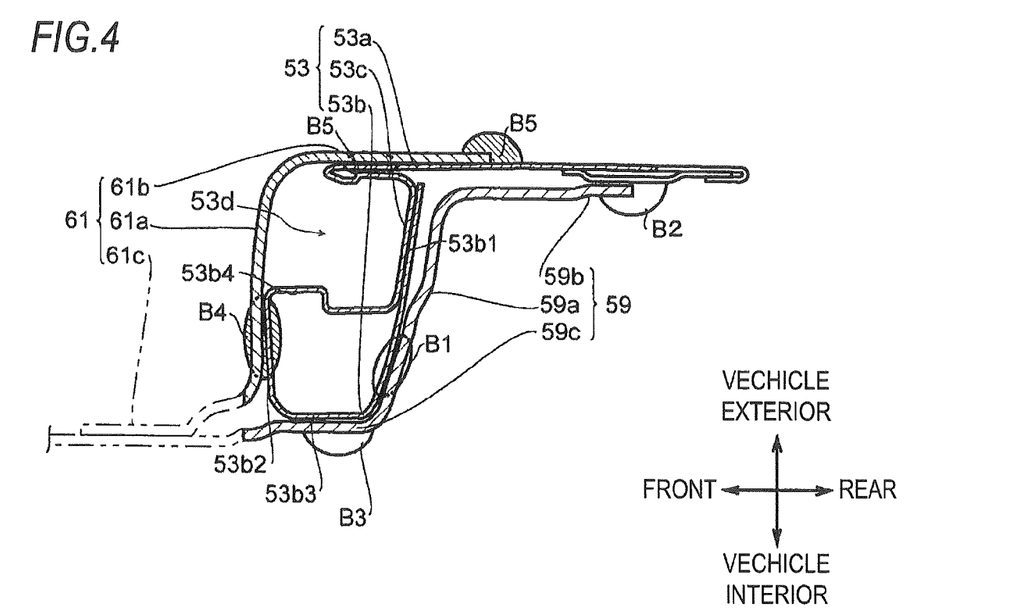
FIG. 4 is a cross-sectional view taken along a line IV-IV of FIG. 1.
Figure 5:
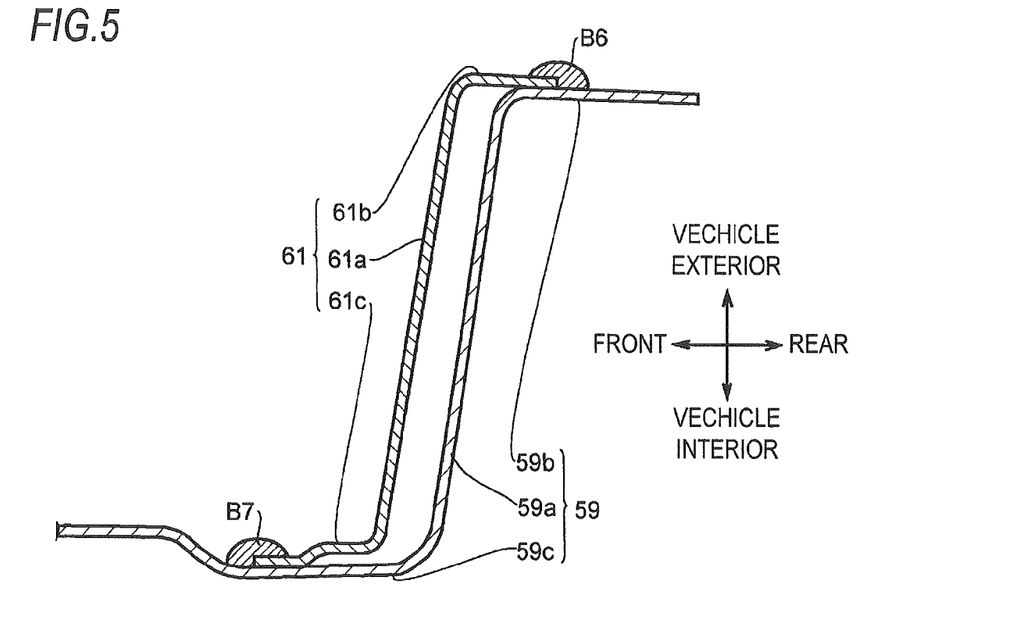
FIG. 5 is a cross-sectional view taken along a line V-V of FIG. 1.

An illustrative embodiment of this disclosure will be described with reference to the drawings. FIG. 1 illustrates a vehicle door of an illustrative embodiment of this disclosure and is an enlarged view of a part I of FIG. 2, FIG. 2 illustrates the entirety of a door sash, a bracket and a patch of the illustrative embodiment, which is seen from a vehicle exterior, FIG. 3 is a rear view of FIG. 1, FIG. 4 is a cross-sectional view taken along a line IV-IV of FIG. 1 and FIG. 5 is a cross-sectional view taken along a line V-V of FIG. 1.

First, an overall configuration is described with reference to FIG. 2. In this illustrative embodiment, a vehicle door is a rear door of a vehicle.

An upper part of a door 51 is provided with a door sash 53 that holds a door glass. A lower part of the door 51 is configured by an outer panel (not shown) and an inner panel 57.

A vehicle interior face of a lower part of the door sash 53 and the inner panel 57 are joined via a bracket 59. In the meantime, the bracket 59 also serves as a base to which a lock device and the like of the door are attached.

Also, in this illustrative embodiment, an inclined direction of the door sash 53 is opposite to an inclined direction of the bracket 59, and a shape including the joined part of the door sash 53 and the bracket 59 has a bent shape (a substantial '<' shape), when seen from a vehicle width direction. Thus, when joining the door sash 53 and the bracket 59, an area in which both overlap each other is small.

A lower part of the bracket 59 is attached to the inner panel 57 by welding and an upper part thereof is attached to the vehicle interior face of the door sash 53 by the welding. Also, a patch 61 is attached to the bracket 59 so as to reinforce a part of the bracket 59 of which strength is relatively weak and is attached to a vehicle exterior face of the bracket 59 and a vehicle exterior face of the door sash 53 by the welding, and the patch 61 sandwiches the door sash 53 in cooperation with the bracket 59.

Subsequently, the door is specifically described with reference to FIGS. 1 and 3 to 5.

(Door sash) The door sash 53 is manufactured by roll-forming of a plate material, and a cross-sectional shape in a direction intersecting with a longitudinal direction has a design part 53a that is exposed to the outside, a bag part 53b that is positioned at a more vehicle interior side than the design part 53a, and a connection part 53c that extends in a vehicle width direction and connects the design part 53a and the bag part 53b, as shown in FIG. 4.

The bag part 53b has a closed cross-sectional shape having a first face 53b1 and a second face 53b2, which extend in the vehicle width direction and face each other, and a third face 53b3 and a fourth face 53b4, which extend in a vehicle front-rear direction and face each other.

Also, a recess part 53d, which has, as a wall part, the fourth face 53b4 of the bag part 53b and a vehicle interior face of the design part 53a and also has, as a bottom part, the connection part 53c, is formed between the bag part 53b and the design part 53a.

(Bracket) As shown in FIGS. 4 and 5, the bracket 59 has a fifth face 59a that extends in the vehicle width direction. As shown in FIG. 4, an upper part of the fifth face 59a of the bracket 59 is attached to the first face 53b1 of the bag part 53b of the door sash 53 by the welding (a bead B1).

Also, the bracket 59 has a seventh face 59b that is bent from one side of the fifth face 59a in the vehicle width direction and extends in the vehicle front-rear direction. As shown in FIG. 4, an upper part of the seventh face 59b is attached to the vehicle interior face of the design part 53a of the door sash 53 by the welding (a bead B2).

Also, the bracket 59 has a ninth face 59c that is bent from the other side of the fifth face 59a in the vehicle width direction and extends in the vehicle front-rear direction. As shown in FIG. 4, an upper part of the ninth face 59c is attached to the third face 53b3 of the bag part 53b of the door sash 53 by the welding (a bead B3).

(Patch) As shown in FIGS. 4 and 5, the patch 61 has a sixth face 61a that extends in the vehicle width direction. As shown in FIG. 4, an upper part of the sixth face 61a of the patch 61 is attached to the second face 53b2 of the bag part 53b of the door sash 53 by the welding (a bead B4). Also, the sixth face 61a of the patch 61 covers an opening of the recess part 53d of the bag part 53b of the door sash 53.

Also, the patch 61 has an eighth face 61b that is bent from one side (a side covering the opening of the recess part 53d of the bag part 53b of the door sash 53) of the sixth face 61a in the vehicle width direction and extends in the vehicle front-rear direction. As shown in FIG. 4, an upper part of the eighth face 61b is attached to a vehicle exterior face of the door sash 53 by the welding (a bead B5). As shown in FIG. 5, a lower part of the eighth face 61b is attached to the seventh face 59b of the bracket 59 by the welding (a bead B6). Incidentally, in this illustrative embodiment, eighth face 61b is attached to the seventh face 59b at two points as shown in FIG. 1

Also, the patch 61 has a tenth face 61c that is bent from the other side of the sixth face 61a in the vehicle width direction and extends in the vehicle front-rear direction. As shown in FIG. 5, a lower part of the tenth face 61c is attached to the ninth face 59c of the bracket 59 by the welding (a bead B7). Incidentally, in this illustrative embodiment, the tenth face 61c is attached to the ninth face 59c at one point.

According to the above configuration, following effects can be obtained.

(1) As shown in FIG. 4, the door sash 53 is sandwiched in the vehicle front-rear direction by the fifth face 59a of the bracket 59 and the sixth face 61a of the patch 61. Also, the door sash 53 is sandwiched by the seventh face 59b of the bracket 59 and the eighth face 61b of the patch. Also, the door sash 53 is sandwiched in the vehicle width direction by the ninth face 59c of the bracket 59 and the eighth face 61b of the patch. Therefore, the attachment strength of the lower part of the door sash 53 and the bracket 59 is improved, and thus the stiffness of the door sash 53 is improved.

(2) The upper part of the patch 61 is attached to the door sash 53 by the welding and the lower part of the patch 61 is attached to the bracket 59 by the welding, so that the attachment strength of the lower part of the door sash 53 and the bracket 59 is improved, and thus the stiffness of the door sash 53 is improved.

(3) The sixth face 61a of the patch 61 covers the opening of the recess part 53d of the bag part 53b of the door sash 53, so that the rigidness of the lower part of the door sash 53 is improved. Additionally, in the above illustrative embodiment, the welding is used so as to join the door sash 53, the bracket 59 and the patch 61. However, this disclosure is not limited to the welding. For example, an adhesive, a soldering and the like may be also used.

Also, although the patch 61 is joined to the bracket 59, it may be also joined to the bracket 59 and the inner panel.

Also, in the above illustrative embodiment, the bracket 59 is joined to the vehicle interior face of the door sash 53 and the patch 61 is joined to the face of the vehicle exterior side of the door sash 53 by the welding. To the contrary, the bracket may be joined to the face of the vehicle exterior side of the door sash and the patch may be joined to the vehicle interior face of the door sash by the welding.

What is claimed is:

1. A vehicle door, comprising:
    a door sash;
    a bracket, which joins the door sash to an inner panel; and
    a patch, which is joined to the bracket and the door sash and which sandwiches the door sash in cooperation with the bracket, thereby reinforcing the bracket,
    wherein the door sash is sandwiched between the patch and the bracket.

2. The vehicle door according to claim 1, wherein the door sash comprises a bag part having a closed cross-sectional shape in a cross-sectional shape in a direction intersecting with a longitudinal direction, and
    wherein the bag part of the door sash is sandwiched in a vehicle front-rear direction by the bracket and the patch.

3. The vehicle door according to claim 1, wherein the door sash comprises a bag part having a closed cross-sectional shape in a cross-sectional shape in a direction intersecting with a longitudinal direction and a design part that is positioned at a more vehicle exterior side than the bag part,
    wherein the patch is joined to a vehicle exterior face of the design part,
    wherein the bracket is joined to a vehicle interior face of the bag part, and
    wherein the door sash is sandwiched in a vehicle width direction by the patch and the bracket.

4. The vehicle door according to claim 1, wherein the door sash comprises:
    a bag part having a closed cross-sectional shape in a cross-sectional shape in a direction intersecting with a longitudinal direction;
    a design part that is positioned at a more vehicle exterior side than the bag part; and
    a connection part that connects the bag part and the design part,
    wherein a recess part is formed between the bag part and the design part, and includes a wall part, which is configured by a vehicle exterior face of the bag part and a vehicle interior face of the design part, and a bottom part, which is configured by the connection part, and wherein the patch covers an opening of the recess part and is connected to the bag part.

5. The vehicle door according to claim 1, wherein the door sash comprises a bag part configured by a first face and a second face, which extend in a vehicle width direction and face each other, and a third face and a fourth face, which extend in a vehicle front-rear direction and face each other, and the door sash comprises a design part, wherein the bracket includes a fifth face that extends in the vehicle width direction, and the bracket includes a seventh face that extends from one side of the fifth face in the vehicle front-rear direction and a ninth face that extends from another side of the fifth face in the vehicle front-rear direction, wherein the patch includes a sixth face that extends in the vehicle width direction, and the patch includes an eighth face that extends from one side of the sixth face in the vehicle front-rear direction and a tenth face that extends from another side of the sixth face in the vehicle front-rear direction.

6. The vehicle door according to claim 5, wherein the seventh face that extends from said one side of the fifth face is joined to the eighth face that extends from said one side of the sixth face, and the ninth face that extends from said another side of the fifth face is joined to the tenth face that extends from said another side of the sixth face, so that the bracket and the patch are joined.

7. The vehicle door according to claim 5, wherein the fifth face, which extends in the vehicle width direction, of the bracket and the sixth face, which extends in the vehicle width direction, of the patch are separated from each other, in the vehicle front-rear direction.

8. The vehicle door according to claim 1, wherein a shape formed by the door sash and the bracket is a bent shape, as viewed from a vehicle width direction.

9. The vehicle door according to claim 5, wherein the eighth face that extends from said one side of the sixth face is joined to a vehicle exterior face of the design part, so that the patch and the door sash are joined.

10. The vehicle door according to claim 5, wherein the sixth face that extends in the vehicle width direction is joined to the second face, which extends in the vehicle width direction, of the bag part, so that the patch and the door sash are joined.

11. The vehicle door according to claim 5, wherein the seventh face that extends from said one side of the fifth face is joined to a vehicle interior face of the design part of the door sash, so that the bracket and the door sash are joined.

12. The vehicle door according to claim 5, wherein the ninth face that extends from said another side of the fifth face is joined to the vehicle interior face of the bag part, so that the bracket and the door sash are joined.

13. The vehicle door according to claim 5, wherein the fifth face that extends in the vehicle width direction is joined to the first face, which extends in the vehicle width direction, of the bag part, so that the bracket and the door sash are joined.

14. The vehicle door according to claim 5, wherein the seventh face that extends from said one side of the fifth face is joined to the eighth face that extends from said one side of the sixth face at two points.

15. The vehicle door according to claim 5, wherein the ninth face that extends from said another side of the fifth face is joined to the tenth face that extends from said another side of the sixth face at one point.

16. The vehicle door according to claim 1, wherein the door sash comprises a bag part having a closed cross-sectional shape in a cross-sectional shape in a direction intersecting with a longitudinal direction.

17. The vehicle door according to claim 1, wherein the door sash comprises a bag part having a closed cross-sectional shape in a cross-sectional shape in a direction intersecting with a longitudinal direction and a design part that is positioned at a more vehicle exterior side than the bag part, wherein the patch is joined to a vehicle exterior face of the design part, and wherein the bracket is joined to a vehicle interior face of the bag part.

18. The vehicle door according to claim 1, wherein the door sash comprises:

a bag part having a closed cross-sectional shape in a cross-sectional shape in a direction intersecting with a longitudinal direction;

a design part that is positioned at a more vehicle exterior side than the bag part; and a connection part that connects the bag part and the design part.

19. The vehicle door according to claim 1, wherein the door sash comprises a bag part configured by a first face and a second face, which extend in a vehicle width direction and face each other, and a third face and a fourth face, which extend in a vehicle front-rear direction and face each other.

\* \* \* \* \*